Patented Aug. 23, 1932

1,873,402

UNITED STATES PATENT OFFICE

WILHELM HERZBERG, OF BERLIN-WILMERSDORF, AND HANS LANGE, OF BERLIN-FRIEDENAU, GERMANY, ASSIGNORS TO I. G. FARBENINDUSTRIE AKTIENGESELLSCHAFT, OF FRANKFORT-ON-THE-MAIN, GERMANY

PROCESS OF PRODUCING METHYLAMINES SUBSTITUTED IN THE METHYL GROUP BY A CYCLIC RADICLE

No Drawing.  Application filed March 23, 1926. Serial No. 96,870.

The present invention relates to a process of producing methylamines of the formula $R-CH_2-NH_2$, R being a carbocyclic radicle.

The invention is based on the following observations:

When reacting on a carbocyclic compound with a halogenomethylphthalimide (compare Gabriel, Berichte der Deutschen Chemischen Gesellschaft, vol. 41, page 242) there is obtained smoothly a nucleal synthesis which may be supposed to occur for example in accordance with the following equation:

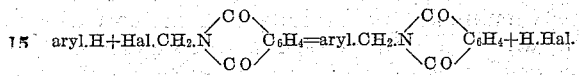

This synthesis may be carried out in the presence of a solvent and also a catalyst may be present.

When the product of this condensation is treated with a cold alkali metal hydroxide solution it is converted into the corresponding salt of a substituted alkylated phthalamic acid, probably in accordance, for example with the equation:

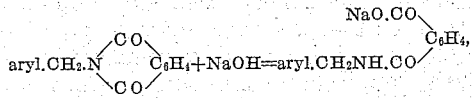

which by treatment with dilute acid yields the corresponding derivative of alkylamine substituted in the methyl group and phthalic acid, probably in accordance for example with the equation:

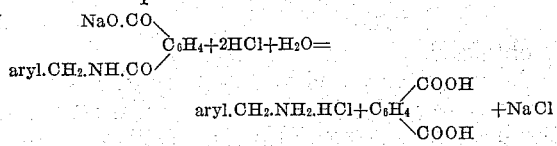

Thus the new process of the manufacture of derivatives of methylamines consists in treating a carbocyclic compound with a halogenomethylphthalimide and decomposing the condensation product by successive treatment with an alkali and an acid.

The following examples illustrate our invention without limiting it, the parts being by weight:

1. 195 parts of chloromethylphthalimide are boiled with 500 parts of pure benzene and 10 parts of zinc chloride for several hours in a reflux apparatus until evolution of hydrogen chloride has ceased. The benzene is then expelled and the residue crystallized from alcohol. 118 parts of the benzylphthalimide thus obtained are stirred with 125 parts of caustic soda solution of 35 per cent strength, 500 parts of water and 500 parts of alcohol until dissolution is complete; then 280 parts of hydrochloric acid of 25 per cent strength are added, the alcohol is expelled and the mass stirred while hot until a clear solution is obtained. On cooling phthalic acid separates and, after the removal of this acid, the solution is made alkaline with caustic soda and the benzylamine extracted with ether and purified in the known manner.

2. Into 424 parts of 1.3-dimethylbenzene there are introduced 195 parts of chloromethylphthalimide and 10 parts of zinc chloride and the whole is heated at 90 to 100° C. for some hours, while stirring, until evolution of hydrogen chloride ceases. The unaltered dimethylbenzene is now expelled with steam and the residue is crystallized from hot alcohol whereby, in addition to a small proportion of a substance sparingly soluble in alcohol, 2.4-dimethylbenzylphthalimide (pseudocumylphthalimide), having a melting point of 111° C., is obtained. 133 parts of this compound are stirred in the cold with 124 parts of caustic soda solution of 35 per cent strength, 300 parts of water and 300 parts of alcohol for about 3 hours; there are then added 300 parts of hydrochloric acid of 25 per cent strength, the alcohol is expelled and the whole is stirred for a few hours on the water bath. On cooling the main quantity of the phthalic acid crystallizes. When it has been separated by filtration the neutralized filtrate can be evaporated to crystallize the hydrochloride of the 2.4-dimethylbenzylamine, having a melting point of 210° C. and corresponding to the following formula:

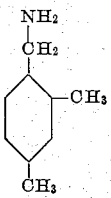

or, by addition of caustic soda to the filtrate, the free base, having a melting point of 218 to 219° C., can be precipitated.

3. 195 parts of chloromethylphthalimide and 10 parts of zinc chloride are introduced gradually into 256 parts of molten naphthalene and the whole is heated, while stirring, until evolution of hydrogen chloride has ceased. The unaltered naphthalene is now expelled with steam and the 1-naphthylmethylphthalimide is obtained by crystallization from alcohol in form of white crystals and melting at 175° C. 72 parts of this naphthylmethylphthalimide are stirred with 70 parts of caustic soda solution of 35 per cent strength, 200 parts of water and 250 parts of alcohol until complete dissolution. There are then added 180 parts of hydrochloric acid of 25 per cent strength, the alcohol is expelled and the residue is stirred while hot until a clear solution is obtained. After cooling excess of strong caustic soda solution is added and the 1-naphthylmethylamine having the following formula:

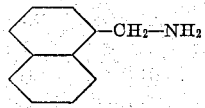

is extracted with ether and purified by distillation in a vacuum.

4. 155 parts of phenol and 325 parts of chloromethylphthalimide are dissolved in 2500 parts of benzene. After addition of 50 parts of zinc chloride the mixture is heated gradually on the water bath to 70 to 80° C. until evolution of hydrogen chloride has ceased. The liquid is decanted and distilled to remove the benzene. From the residue the condensation product may be obtained by recrystallization from hot alcohol in the form of pure white crystals. 25 parts thereof are stirred in the cold for two hours with 30 parts of caustic soda solution of 35 per cent strength and 200 parts of water. After this the whole is acidified with dilute hydrochloric acid and heated on the water bath until some separated oil has passed into solution. By several extractions with ether the phthalic acid is separated and then the aqueous solution, feebly acid with hydrochloric acid, is evaporated to dryness in a vacuum. The residue is extracted with anhydrous alcohol. By evaporating the solution 4-hydroxybenzylamine hydrochloride is obtained besides a little 2-hydroxybenzylamine hydrochloride. 4-hydroxybenzylamine having the following formula:

melts at 107° C., 2-hydroxybenzylamine having the following formula:

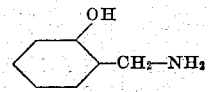

melts at 129° C.

5. 195 parts of chloromethylphthalimide are dissolved in 324 parts of methoxybenzene, 10 parts of zinc chloride are added and the whole heated to 120° C. When evolution of hydrogen chloride has ceased, the excess of methoxybenzene is distilled with steam and the residue treated with cold alcohol, whereby the 4-methoxybenzylphthalimide is obtained in nearly theoretical yield in the form of crystals having a melting point of 104° C. 50 parts of this compound are stirred in the cold for 2 hours with 50 parts of alcohol, 100 parts of caustic soda solution of 35 per cent strength and 200 parts of water. The mixture is acidified with dilute hydrochloric acid, the alcohol expelled and some oil which has separated brought into solution by addition of water. After extracting the phthalic acid with ether, the hydrochloric acid solution is evaporated in a vacuum and the residue is extracted with alcohol to obtain 4-methoxy-1-benzylamine hydrochloride. From the concentrated aqueous solution of the salt the free base having the following formula:

is obtained by adding caustic soda and extracting with ether.

6. 63 parts of guaiacol and 32 parts of chloromethylphthalimide are condensed in the manner prescribed in example 5 but without the use of a catalyst to form 4-hydroxy-3-methoxybenzylphthalimide of melting point 154° C. By decomposing this product in the manner prescribed vanillylamine (4-hydroxy-3-methoxybenzylamine) having the following formula:

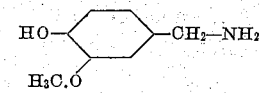

is obtained.

7. 195 parts of chloromethylphthalimide are dissolved in 411 parts of 2-nitro-1-methylbenzene. After addition of 10 parts of zinc chloride the solution is heated, while stirring, at 120 to 130° C. until evolution of hydrogen chloride ceases. The excess of nitromethylbenzene is expelled with steam and the residue is crystallized from alcohol. 100 parts of this condensation product are stirred with 80 parts of caustic soda solution of 35 per cent strength, 300 parts of water and 300 parts of alcohol in the cold until dissolution occurs, and then 150 parts of hydrochloric acid of 25 per cent strength are added, the alcohol is expelled and the residue stirred on the water bath until the whole has dissolved. After cooling the separated phthalic acid is filtered and the filtrate is mixed with excess of ammonia and extracted with ether which takes out the 3-nitro-4-methyl-benzylamine having the following formula:

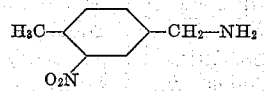

this may be purified by distillation in a vacuum.

8. 26.5 parts of 2.4-dimethylbenzylphthalimide (compare Example 2) are dissolved in 130 parts of nitrobenzene and the solution is heated with 19.5 parts of chloromethylphthalimide and 3 parts of zinc chloride at 80 to 100° C. When evolution of hydrogen chloride is at an end the product crystallizes. It is 2.4-dimethyl-1.5-(omega-phthalimidemethyl)-benzene and forms white crystals having a melting point of 274° C. After expelling the nitrobenzene a further quantity of the product can be obtained from the residue. 37 parts of the product are stirred while heating with 150 parts of alcohol, 150 parts of water and 20 parts of caustic soda solution of 35 per cent strength until the whole is passed into solution. After cooling there are added 90 parts of hydrochloric acid of 12° Baumé and the mixture is stirred while heating and at the same time expelling alcohol until a clear solution is obtained. From this solution phthalic acid crystallizes on cooling; the filtrate from this is mixed with excess of caustic soda and extracted with ether. From the ethereal solution there is obtained 2.4-dimethyl-1.5-di-(omega-aminomethyl)-benzene having the following formula:

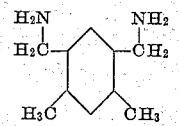

in the form of white crystals melting at 123° C.

9. 57.4 parts of 1-naphthymethylphthalimide (compare Example 3) are dissolved in 500 parts of nitrobenzene and the solution is heated with 78 parts of chloromethylphthalimide and 10 parts of zinc chloride to 100 to 120° C. When evolution of hydrogen chloride is at an end the nitrobenzene is distilled with steam. The tri-phthalimide thus obtained and derived from 1.4.8-tri-(omega-aminomethyl)-naphthalene is in the form of crystals which dissolve with great difficulty in alcohol. 106 parts of this phthalimide are dissolved in 500 parts of alcohol, 430 parts of water and 70 parts of caustic soda solution of 35 per cent strength, and is then split up by heating the solution with 200 parts of hydrochloric acid of 12° Baumé. The phthalic acid is separated, excess of caustic soda is added to the solution, which is then extracted with chloroform. On evaporating the chloroform 1.4.8-tri-(omega-aminomethyl)-naphthalene having the following formula:

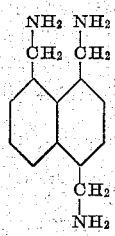

remains as an oil soluble in water and boiling at 240–245° C. at 15 millimeters pressure.

10. 89 parts of anthracene are dissolved together with 195 parts of chloromethylphthalimide and 10 parts of zinc chloride in nitrobenzene and the solution is heated to 85 to 100° C. 146 parts of the product thus obtained are dissolved with aid of heat in 1000 parts of alcohol, 400 parts of water and 83 parts of caustic soda solution of 35° Baumé and the product formed is split up by adding 200 parts of hydrochloric acid of 12° Baumé. The phthalic acid separates, excess of caustic soda is added to the solution, which is then shaken with benzene to extract the 9.10-di-(omega-aminomethyl)-anthracene having the following formula:

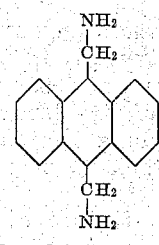

It forms crystals which are sparingly soluble in water and decompose between 250 and 270° C.

In an analogous manner other carbo cyclic compounds may be condensed with a halogenomethylphthalimide, for instance aromatic hydrocarbons, hydroaromatic hydrocarbons, such as cyclohexane and tetrahydronaphthalene, halogen derivatives, nitro derivatives, hydroxy derivatives, alkoxy-derivatives of such hydrocarbons, carboxylic acids, such as salicyclic acid, arylomethylphthalimides and generally carbo cyclic compounds containing radicals of an acid character.

What we claim is:—

1. The process which comprises heating about 63 parts of guaiacol and 32 parts of N-(chloro-methyl)-phthalimide to a temperature of about 120° C. until evolution of hydrogen chloride has ceased, isolating the 4-hydroxy-3-m e t h o x y-benzyl-phthalimide thus obtained, splitting it in the cold with a caustic soda solution, and in succession splitting the 4-hydroxy-3-methoxybenzylphthalamic acid with an amount of dilute hydrochloric acid required to neutralize the alkali added and to bind the vanillylamine formed.

2. In the manufacture of alkylamines substituted in the alkyl group by a carbocyclic compound, the step which comprises condensing an N-(halogen-methyl)-phthalimide with a carbocyclic compound, having a labile hydrogen atom attached to a cyclic carbon atom.

3. In the manufacture of alkylamines substituted in the alkyl group by an aromatic compound, the step which comprises condensing an N-(halogen-methyl)-phthalimide with an aromatic compound, having a labile hydrogen atom attached to a cyclic carbon atom.

4. In the manufacture of alkylamines substituted in the alkyl group by an aromatic compound, the step which comprises condensing N-(chloro-methyl)-phthalimide with an aromatic compound, having a labile hydrogen atom attached to a cyclic carbon atom.

5. In the manufacture of alkylamines substituted in the alkyl group by an aromatic compound, the step which comprises condensing N-(chloro-methyl)-phthalimide with an aromatic compound being substituted by at least one substituent of the group consisting of hydroxyl and alkoxyl, but having a labile hydrogen atom attached to a cyclic carbon atom.

6. In the manufacture of alkylamines substituted in the alkyl group by an aromatic compound, the step which comprises condensing N-(chloro-methyl)-phthalimide with an alkoxy-aryl compound, having a labile hydrogen atom attached to a cyclic carbon atom.

7. In the manufacture of vanillylamine the step which comprises condensing N-(chloro-methyl)-phthalimide with guaiacol.

8. The process which comprises condensing an N-(halogen-methyl)-phthalimide with a carbocyclic compound having a labile hydrogen atom attached to a cyclic carbon atom, splitting the condensation product formed with an alkali and in succession splitting the N-substituted phthalamic acid formed with an amount of diluted acid approximately required to neutralize the alkali added and to bind the finally formed methylamines aromatically substituted in the methyl group.

9. The process which comprises condensing an N-(halogen-methyl)-phthalimide with an aromatic compound having a labile hydrogen atom attached to a cyclic carbon atom, splitting the condensation product formed with an alkali and in succession splitting the N-substituted phthalamic acid formed with an amount of diluted acid approximately required to neutralize the alkali added and to bind the finally formed methylamines aromatically substituted in the methyl group.

10. The process which comprises condensing N-(chloro-methyl)-phthalimide with an aromatic compound having a labile hydrogen atom attached to a cyclic carbon atom, splitting the condensation product formed with an alkali and in succession splitting the N-substituted phthalamic acid formed with an amount of diluted acid approximately required to neutralize the alkali added and to bind the finally formed methylamines aromatically substituted in the methyl group.

11. The process which comprises condensing N-(chloro-methyl)-phthalimide with an aromatic compound having a labile hydrogen atom attached to a cyclic carbon atom, but being substituted by at least one substituent of the group consisting of hydroxyl and alkoxy, splitting the condensation product formed with an alkali and in succession splitting the N-substituted phthalamic acid formed with an amount of diluted acid approximately required to neutralize the alkali added and to bind the finally formed methylamines aromatically substituted in the methyl group.

12. The process which comprises condensing an N-(chloro-methyl)-phthalimide with an alkoxy-aryl compound having a labile hydrogen atom attached to a cyclic carbon atom, splitting the condensation product formed with an alkali and in succession splitting the N-substituted phthalamic acid formed with an amount of diluted acid approximately required to neutralize the alkali added and to bind the finally formed methylamines aromatically substituted in the methyl group.

13. The process which comprises condensing N-(chloro-methyl)-phthalimide with guaiacol, splitting the condensation product formed with an alkali and in succession splitting the 4-hydroxy-3-methoxybenzylphthalamic acid with an amount of diluted acid approximately required to neutralize the alkali added and to bind the vanillylamine formed.

In testimony whereof we affix our signatures.

WILHELM HERZBERG.
HANS LANGE.